United States Patent
Horovitz et al.

(10) Patent No.: US 8,966,623 B2
(45) Date of Patent: Feb. 24, 2015

(54) MANAGING EXECUTION OF A RUNNING-PAGE IN A VIRTUAL MACHINE

(75) Inventors: Oded Horovitz, Palo Alto, CA (US); Samuel Larsen, San Francisco, CA (US); Gilad Arie Wolff, San Francisco, CA (US); Marios Leventopoulos, Palo Alto, CA (US); Bharath Chandramohan, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 434 days.

(21) Appl. No.: 13/043,264

(22) Filed: Mar. 8, 2011

(65) Prior Publication Data

US 2011/0219447 A1 Sep. 8, 2011

Related U.S. Application Data

(60) Provisional application No. 61/311,488, filed on Mar. 8, 2010.

(51) Int. Cl.
G06F 9/455 (2006.01)

(52) U.S. Cl.
CPC .................. G06F 9/45533 (2013.01)

USPC ............................................. 726/22

(58) Field of Classification Search
CPC ................................ G06F 9/45533
USPC ............................................. 726/22
See application file for complete search history.

(56) References Cited

U.S. PATENT DOCUMENTS

| 4,809,160 A * | 2/1989 | Mahon et al. ............. 726/4 |
| 8,225,317 B1 * | 7/2012 | Chiueh et al. ............ 718/1 |
| 2009/0164995 A1 * | 6/2009 | Waris ................... 718/100 |

\* cited by examiner

Primary Examiner — Jacob Lipman

(57) ABSTRACT

Computer implemented methods, system and apparatus for managing execution of a running-page in a virtual machine include associating an execution trace code with the running page by a security virtual machine. The execution trace code generates a notification upon initiation of the execution of the running page by the virtual machine. The notification is received by the security virtual machine running independent of the virtual machine executing the running-page. The running page associated with the execution trace code is validated by the security virtual machine as authorized for execution. An exception is generated if the running-page is not authorized for execution. The generated exception is to prevent the execution of the running page in the virtual machine.

33 Claims, 5 Drawing Sheets

MANAGING EXECUTION OF A RUNNING-PAGE IN A VIRTUAL MACHINE

CROSS REFERENCE TO RELATED APPLICATIONS

This application claims benefit of earlier filed provisional application No. 61/311,488 filed Mar. 8, 2010 and having the same title as the present application which is hereby incorporated by reference in its entirety.

BACKGROUND

1. Field of the Invention

The present invention relates to computer security, and more particular, to identifying unauthorized and potentially malicious code running on the operating system's kernel.

2. Description of the Related Art

Computer security is top most priority for an enterprise. With the ubiquitous nature of computing system and ever increasing number of computer applications, computer users are constantly confronted with the need to protect their computers from malicious codes and/or existing code malfunction. Malicious codes have plagued common computer users and large enterprises alike. The damages incurred by the users/enterprises include system downtime, identity thefts and loss of other sensitive information. The most common way a malicious code makes its way into a computer system is by taking advantage of weaknesses in software running on the system. In addition to malicious codes, some of the software loaded on the computer system may become corrupt and might not provide the same functionality as was originally designed. The corrupted software code resides in the system and executes whenever the system boots up or when an application associated with the corrupted code executes.

In order to prevent the malicious codes from making their way into the computer system, enterprises have developed their own anti-virus solutions or installed anti-virus solutions developed by others to ensure that the malfunctioning/malicious codes do not execute on the computer system compromising the secure and sensitive information contained therein. Some of the solutions detect and remove the problem codes while some others detect and repair the malfunctioning code. In the case where the solutions detect and remove the problem codes, the solutions are typically reactive in nature, wherein the solutions are designed and executed after a malicious/malfunctioning code has already executed on the computer. These security solutions have to be updated constantly to address newly developed malicious codes so that adequate protections are met for the computer system.

Preventing malicious codes from running in a computer system may involve a hardware solution wherein access control bits are set for pages in memory in order to prevent the code on a given page of memory from executing. The problem with the hardware solution is there is no guarantee that the data within the page itself is not corrupted. Further, if the code within the operating system components is itself corrupted by malicious codes, the setting of the access control bits will be affected, which, in turn, affects the security of those pages.

Additionally, most of the solutions are reactive and do not guarantee the validity of currently executing code or codes that bypass a segment and jump to a new memory region and begin executing. The bypassing of a segment essentially allows circumnavigating any securities provided at specific pages in memory making these solutions ineffective. Further, these solutions are operating system dependent and reside and execute on each guest virtual machine (GVM or guest). This means that the solutions are distributed. The solutions running on each guest try to intercept viruses at each of the guests as files are accessed on the guest. However, the in-guest viruses may compromise the security within the guest allowing malicious code access to the sensitive data. Also, every time a specific guest's operating system (OS) is updated or service pack or software patch is installed, the solutions running on that guest may have to be updated so that the solutions support the guest's OS updates leading to non-centralized solution updates.

It is in this context embodiments of the invention arise.

SUMMARY

Embodiments of the present invention provide computer-implemented methods, systems and apparatus for managing execution of a running-page in a virtual machine within a managed cluster. A notification of a running-page that is initiated for execution on the virtual machine is received at a security virtual machine. The running-page is validated in real-time by the security virtual machine prior to execution at the virtual machine to ensure that no unauthorized code executes at the virtual machine. The security virtual machine includes verification logic to validate the contents of the running-page against a list of authorized pages. When the validation is successful, the running-page is allowed to execute on the virtual machine. When the validation is unsuccessful, a security exception is generated for the running-page by the security virtual machine. The security exception prevents the running-page from executing at the virtual machine.

Providing the logic at the security virtual machine external to the virtual machine has several advantages. For one, the verification logic is operating system agnostic as it is provided external to the virtual machine. As a result, the security inspections for the running-page are done external to the virtual machine on which the running-page is to be executed, thereby isolating the verification logic in the security virtual machine from the code in the running-page of the virtual machine, thus preventing the operating system and other system/application code on the virtual machine and the verification logic on the security virtual machine from getting compromised. Thus, if there is any malicious code in the running-page, it is difficult and often impossible to compromise the logic in the security virtual machine. Further, by using a separate security virtual machine to perform the validation, a uniform, distributed, centralized and efficient security solution is provided to multiple virtual machines within the managed cluster. The isolated verification logic also supports operating system updates and service packs/patch, making this a more efficient and robust solution for identifying unauthorized code and managing execution of a running-page in the virtual machine.

It should be appreciated that the present invention can be implemented in numerous ways, such as a process, an apparatus, a system, a device or a method on a computer readable medium. Several inventive embodiments of the present invention are described below.

In one embodiment, a computer implemented method for managing execution of a running-page in a virtual machine is disclosed. The virtual machine is part of a managed cluster, which includes a plurality of hosts each running a plurality of virtual machines. The method includes associating an execution trace code with the running-page. The execution trace code generates a notification upon initiation of the execution of the running-page by the virtual machine. The notification is received by a security virtual machine running independent of the virtual machine executing the running-page. The running page associated with the execution trace code is validated by the security virtual machine as authorized for execution. An run-time exception is generated by the security virtual machine if the running-page is not authorized for execution. The exception prevents the execution of the running-page in the virtual machine.

In another embodiment, a computer program embedded in a computer-readable storage medium for managing execution of a running page in a virtual machine is disclosed. The computer program includes program instructions for associating an execution trace code with the running-page. The execution trace code generates a notification when the execution of the running-page is initiated by the virtual machine. The computer program also includes program instructions for receiving the notification at the security virtual machine that is running independent of the virtual machine executing the running-page. The computer program further includes program instructions for validating the running-page associated with the execution trace code as authorized for execution upon the receipt of the notification. The validation is performed by the security virtual machine. The computer program includes program instructions for generating an exception if the running-page is not authorized for execution by the security virtual machine. The exception prevents the execution of the running-page in the virtual machine.

In yet another embodiment, a system for managing execution of a running-page in a virtual machine on a host within a managed cluster is disclosed. The managed cluster includes a plurality of hosts each running a plurality of virtual machines. The system includes a virtual security interface at the virtual machine, an external security agent deployed at the host for the virtual machine within the managed cluster and a security server virtual machine that is different from the virtual machine on which the running-page executes. The virtual security interface is configured to detect initiation of an execution of a running-page through an execution trace code associated with the running-page. The execution trace code generates a notification upon initiation of the execution of the running page. The virtual security interface is also configured to inspect state of processor and memory of the virtual machine and update software available on a virtual hard drive associated with the virtual machine. The external security agent deployed at the host is configured to enforce security policies defined for the managed cluster at the virtual machine associated with the host; monitor execution and modification of the running-page on the virtual machine; assist in the verification of the running-page prior to execution on the virtual machine; inspect the virtual hard drive associated with the virtual machine to ensure software updates are valid; and trigger a security event upon unsuccessful verification of the running-page. The security server virtual machine includes an intercept verification engine wherein the intercept verification engine is configured to introduce the execution trace code to notify when the running-page is initiated for execution at the virtual machine; pause execution of the running-page at the virtual machine based on the notification received from the execution trace code; validate contents of the running-page; report security events triggered at the running-page due to unsuccessful validation; remove the execution trace code and introduce a write trace code upon successful validation of the contents of the running-page. The removal of the execution trace code permits the execution of the running-page at the virtual machine. The intercept verification engine is further configured to manage security policy for the managed cluster including updates to security policy. The updates to the security policy include both content update and code update.

In yet another embodiment, a method for managing execution of a running-page in a virtual machine is disclosed. The method includes associating an execution trace code with the running-page. The execution trace code is configured to generate a notification upon initiation of the execution of the running-page by the virtual machine. A notification is received by a security virtual machine indicating initiation of execution of the running-page. The security virtual machine runs independently of the virtual machine executing the running-page. The running-page associated with the execution trace code is validated as authorized for execution by the security virtual machine. The validation of the running-page includes comparing contents of the running-page with contents of a plurality of authorized pages for execution by identifying a subgroup of authorized pages and then finding a match of the running-page within the identified subgroup of authorized pages using a hash value. When the running-page is not authorized for execution, generating an exception so as to prevent the execution of the running-page in the virtual machine. The generation of an exception is performed by the security virtual machine.

Other aspects of the invention will become apparent from the following detailed description, taken in conjunction with the accompanying drawings, illustrating, by way of example, the principles of the invention.

BRIEF DESCRIPTION OF THE DRAWINGS

The invention may best be understood by reference to the following description taken in conjunction with the accompanying drawings.

DETAILED DESCRIPTION

Figure 1:
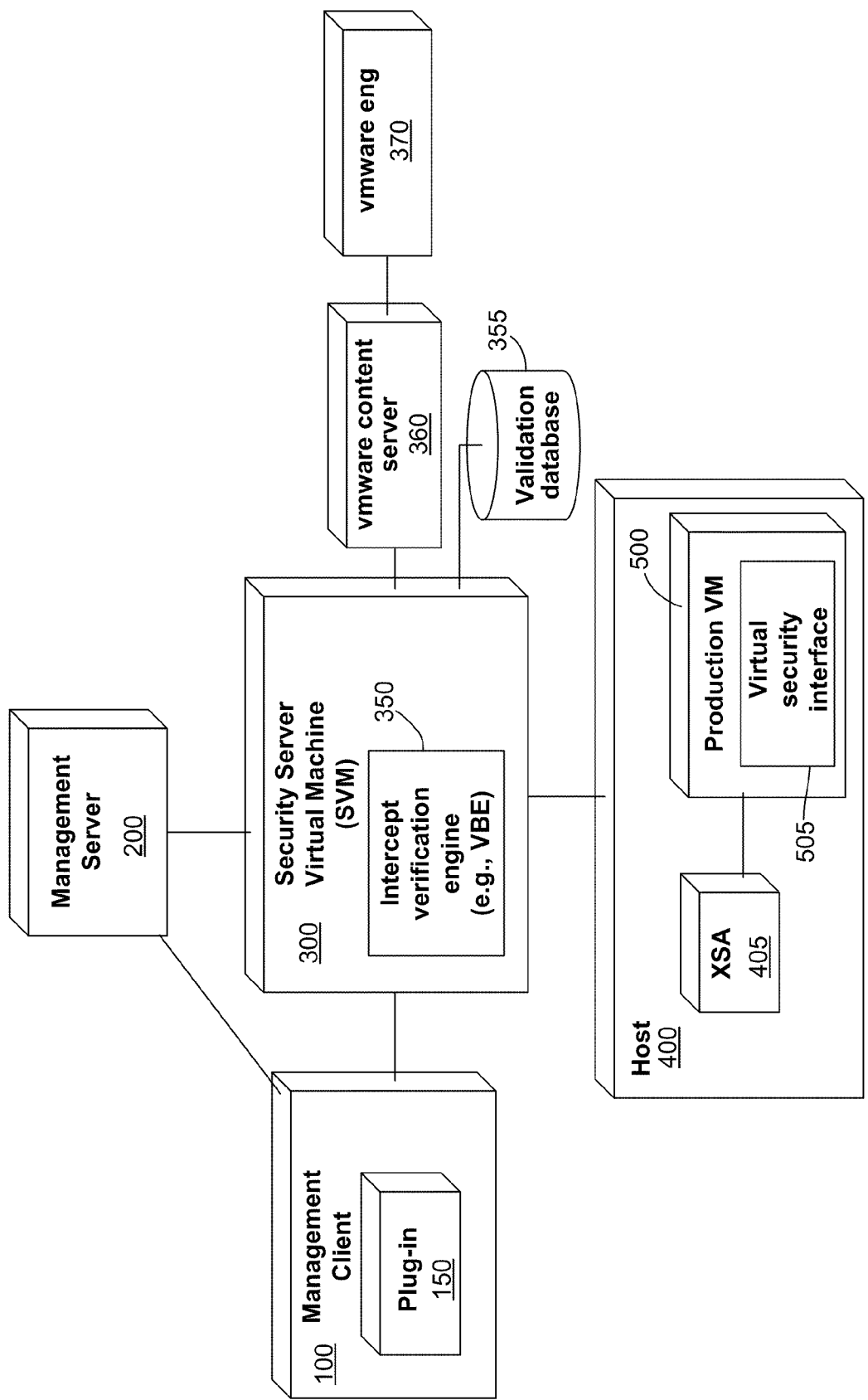
FIG. 1 illustrates a high level view of a verification system and the various components within the verification system that is used for managing execution of a running-page in a virtual machine, in accordance with one embodiment of the present invention.

Broadly speaking, the embodiments of the present invention provide methods, apparatus and computer-implemented systems for managing execution of a running-page of a virtual machine. The virtual machine is managed by a management server. The management server may be adapted within a virtual infrastructure (VI) to define a cluster such as a group of VM servers that are pooled together to share or distribute resources. Each VM server runs one or more VMs. Virtualization and clustering allows a computing system to perform the job of multiple computing systems by abstracting computer resources such as hardware, and sharing these resources across multiple environments including hosting multiple operating systems and multiple applications available locally or at remote locations. With the distributed nature of the managed cluster, it is essential that the code running in each of the VMs are authorized irrespective of the guest operating system they are running so as to not compromise the security of the VMs.

Towards this end, an exemplary security solution is provided in an intercept verification engine of a second virtual machine within a managed cluster, such as a security virtual machine (SVM), that, in one embodiment, is distinct and separate from the production virtual machines in the cluster managed by the management server. In another embodiment, SVM may be implemented as a VM that is considered part of the managed cluster or even present on a host along with the security-managed VMs. In one embodiment, this security solution includes logic to receive notification of a running-page that is initiated for execution at a virtual machine within managed cluster. The running-page has code that is configured to execute at a kernel of the virtual machine, in one embodiment. Upon receipt of the notification, the SVM intercepts the execution of the running-page at the virtual machine in order to validate the running-page before the page is allowed to execute at the VM. The SVM verifies the running-page against a list of authorized pages (also termed "white" list) by matching the contents of the running-page against the contents of authorized pages in the white list to ensure that codes within the running-page are authorized for executing at the virtual machine. The white list includes files from certified sources and pages that are authorized to execute at the kernel of the virtual machines within the managed cluster. The white list is generated based on a security policy defined by the management server. If the running-page is validated, then the running-page is allowed to execute on the virtual machine. If, on the other hand, the running-page is not authorized, i.e., the contents of the running-page do not find any match in the white list, a security exception is generated that prevents the running-page from executing at the virtual machine. Thus, the SVM actively monitors and manages execution of codes in the virtual machine in the managed cluster from outside the virtual machine so that unauthorized code that can compromise the security of the virtual machine is prevented from running at the virtual machine (VM).

Running the security solution outside the virtual machines permits identification and prevention of malicious codes from compromising the VMs. The security solution validates and ensures that codes that are already in the VMs and new codes that are updated to the VMs are safe and are authorized prior to execution in the VMs. As the security solution is found in the SVM outside of the VMs, all the security inspections performed by the security solution are done outside the VM through the SVM. This provides a preventive, rather than reactive solution because the running-page is prevented from executing on the virtual machine until the running-page is verified and validated against an authorized list outside of the VM. Further, keeping the security solution in a distinct VM provides additional benefit of preventing the security solution itself from getting compromised. Furthermore, the SVM can access any virtual machine within the managed cluster irrespective of the OS running on the VMs. The OS information and knowledge is only relied upon for generating the white list of authorized pages for the managed VM cluster. Once the white list is generated, the security solution becomes OS independent and is used to detect unauthorized code in a running-page configured to execute on any VM in the managed cluster. Moreover, the security solution on the SVM provides a flexible, efficient, distributed, uniform and centralized solution to the multiple VMs. Any OS updates or service packs/patches to any one or multiple VMs are automatically supported by the current embodiments. As the security solution resides on a separate VM, any service packs/patches and OS updates at any VMs does not adversely affect the operation of the security solution. It is not necessary to update the security solution to reflect the changes/updates in the VMs in order to make the security solution operate in the updated VMs. Additional benefits can be realized based on the following detailed description.

With the above brief overview in mind, the following description sets forth numerous specific details in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

FIG. 1 illustrates by way of example a high level view of a verification system and the various components within the verification system that is used in deploying security solution for detecting unauthorized code in a running-page scheduled for execution by a VM within a managed VM cluster. The managed VM cluster within a virtual infrastructure includes a cluster of VM hosts each running one or more VMs. Each of the hosts 400 (only one shown) may be configured to run a plurality of protected virtual machines 500 (only one shown). The virtualization-aware security solution is deployed within the verification system over security server virtual machine (SVM) 300. In one embodiment, SVM 300 is an independent VM that is different from the VMs running under the plurality of hosts within the managed cluster. Specifically, SVM 300 is equipped with intercept verification engine (IVE) 350, such as a Verify Before Execute (VBE) engine, having verification logic for managing execution of a running-page that is scheduled for execution within VM 500 running on host 400 in the managed cluster. In one embodiment, the running-page is scheduled to run in a kernel (not shown) of VM 500.

IVE 350 within the SVM 300 provides interfaces and logics to interact with the virtual hardware of virtual machines such as memory, CPU, network devices, storage and input/output (I/O) systems to ensure that the VMs security is not compromised. Specifically, the SVM 300 reads and tracks certain properties associated with the virtual hardware of the running VM 500 to determine memory and CPU states, network packet-filtering for both host and VM, process execution within the VM, and storage devices to ensure that unauthorized code is not executing or accessing the hardware and any and all updates, including patches, are free of malware. In order to assist in the monitoring and managing of access to the various virtual hardware, the SVM 300 introduces an execution trace code in all the physical pages associated with the running VM. The execution trace code is introduced at the physical page (also referred to as "running" page) so as to activate when the physical page is initiated for running on a VM. The running-page, in one embodiment, is a privileged page with code that runs in a VM's operating system kernel. In one embodiment, SVM 300 is a dedicated VM that includes the security solution and is used solely for verifying authenticity of the codes within running-pages available in any VMs associated with any host in the managed cluster. In one embodiment, the execution trace code is introduced at all physical pages that are scheduled to run on the VM. In another embodiment, the trace codes are introduced at only privileged pages. All non-privileged pages, in this embodiment, are added to a retrace list and are validated periodically by introducing the execution trace code at run-time.

Referring back to FIG. 1, IVE interacts with the SVM's Application Programming Interface (API) (not shown) in monitoring and managing execution of the running-page in the kernel of a VM within the managed cluster through the execution trace code. IVE 350 in the SVM 300 installs an execution trace code in each of the running-pages in the VM so that when the running-pages are set to execute, the execution trace is triggered. In one embodiment, the execution trace from the running-page provides a notification message that includes the identity of the running-page along with identity of the VM (e.g., VM 500) on which it is scheduled for execution. When a notification is received at the SVM 300 that a running-page is set for execution on a particular VM, IVE 350 allows interruption of the execution of the running-page at the specific VM. This may include pausing execution of the running-page at the VM 500 until the contents of the page are validated. Upon interception of the execution of the running-page, IVE 350 checks the running-page against a list of pages that are authorized to execute in the VM. The list of authorized pages may be obtained from trusted and reliable sources and maintained in a "White list." In one embodiment, the white list may be maintained external to the VMs in a validation database 355 for the managed cluster and made available to IVE 350 during a validation process. In one embodiment, in addition to a white list, additional lists may be maintained in validation database 355 to enable identification of the pages. For instance, a grey list may be maintained for pages that include unclassified code and a black list may be maintained for pages that include unauthorized code. IVE 350 verifies the contents of the running-page using the white list to determine if a match is found.

The contents of the page may include execution code and data that the execution code can manipulate. During the matching of the running-page, ive 350 compares the execution code of the running-page against the codes in the authorized pages in the white list to see if a match can be found for the execution code in the running-page. The running-page may include a plurality of execution codes and IVE 350 will try to find matches for each of the execution code in the white list. If a match is found, then the running-page is authorized to execute on the kernel of the VM. Upon successful matching that indicates validity of the execution code, SVM 300 interacts with VM 500 to reset the trace code on the running-page. Accordingly, SVM 300 removes the execution trace code and introduces a write trace code for the running-page. SVM 300 introduces the write trace code to ensure that the running-page is not modified during its execution in the kernel. SVM 300 then allows the running-page to execute on the kernel of the VM and monitors the execution. Although in the embodiments, it is mentioned that the SVM performs certain actions when managing execution of the running-page, it should be noted that it is IVE 350 within the SVM that includes the logic that drives the SVM to perform such actions. In some instances, the terms IVE and SVM may be used interchangeably to refer to the actions performed by the SVM as the IVE includes the logic to drive the SVM to perform the actions.

If, on the other hand, the running-page includes code that does not find a match in the white list having the list of authorized pages, the running-page is not authorized to run on the virtual machine. In such cases, the IVE mitigates a potential attack by generating an exception event that prevents the running-page from executing on the virtual machine. The exception event may be a suspend event, a jump event, a kill event, a log event or any other event that provides clear indication that an unauthorized code is present in the running-page. Based on the exception event, the running-page is suspended from execution. The list of exception events is exemplary and is not limiting. Other events may be included so long as the event prevents the running-page from executing at the virtual machine.

If, during the execution of the running-page, the VBE receives a write trace trigger, then it means that the running-page has been modified. Part of the execution of the running-page may include writing into the running-page. Modification to the running-page may include introduction of either additional data or additional code in the running-page. If the modifications include introduction of additional code in the running-page, then the running-page has to be re-validated in order to ensure that the newly included code does not have malware. At this time, WE 350 removes the write trace and re-introduces the execution trace for the running-page so that the running-page can be re-validated during subsequent execution. By re-introducing the execution trace, IVE 350 makes sure that the system knows that a modification has occurred in the running-page that needs to be re-validated before the running-page can be executed. Based on when the running-page triggers the execution trace, the current contents, including the modification, are then re-validated against contents of the white list. Once the contents are re-validated, the running-page is authorized for execution. It should be noted that at any given time the running-page includes either an execution trace or a write trace.

In one embodiment, the running-page may switch between execution trace and write trace. Depending on the type of code in the page, the page may be executed, then written to and then executed again, and so on. Every time the page is written to, the write trace is triggered. At this time, SVM 300 removes the write trace and re-introduces an execute trace so that the page can be verified before the page executes again. In order to minimize the number of times SVM 300 performs the verification of code in the same running-page, SVM 300 may monitor the running-page to determine the number of times the running-page flips between execution trace and write trace. This can be done by using a flip count for each running-page and updating the flip count every time the running-page flips between write trace to execution trace and vice versa. A threshold value may be defined by SVM 300 for allowing flipping of a particular running-page. When the flip count reaches the threshold value, SVM 350 may remove the trace code, either the write trace or execution trace, so that the page can execute without the trace code. The page may then be included onto a list of pages that undergo periodic verification, such as a "retrace" list. In one embodiment, the retrace list includes pages that are non-privileged, pages that are known or suspected to contain data, running-pages that incur a lot of events and flipping running-pages. The periodic verification may include verifying after a set period of time, at particular time of day, at specific flip-counts, etc.

In one embodiment, upon encountering an unmatched running-page, the CPU of the VM may amend certain key register values so that the running-page can match with the available pages in the white list and execute at the VM. In this embodiment, IVE 350 detects the change and updates the white list for the files associated with the modified key register values so that the SVM can use the updated white list for matching with the running-age. This is to ensure that the running-page has matched with a file from a trusted source and is guaranteed to be genuine. Once IVE 350 determines that there is a match, IVE 350 allows the page to execute.

In addition to the introduction of trace code and monitoring access to virtual hardware, SVM 300 may be further configured to manage security policies and solutions for the managed VM cluster. In order to achieve this, SVM 300 interacts with content server 360 to obtain information related to the security solution including updates to security policies, updates to authorized list of pages, updates to security solutions and authorized list of pages based on updates to security policies, etc. The updates to security solutions include code updates as well as content updates. The security policies dictate the type of code that is allowed to run on each virtual machine in the managed cluster. It should be noted that as and when security policies change for the managed cluster, the white list for the managed cluster is automatically updated to reflect the changes to the security policies. This might include updating the list of authorized pages based on security policy change. The updates to the security policies and white list are used in managing detection of unauthorized code and preventing same from executing on the VMs. As and when SVM 300 receives updates to the security policies, SVM 300 applies the updated security policies defined for the managed cluster to virtual machines one at a time or simultaneously to a group of virtual machines that are part of the managed cluster. In another embodiment, SVM 300 applies the updated security policies periodically to the VMs in the managed cluster.

The SVM 300 may also deploy external security agents (XSA) 405 to each required host 400 in the managed cluster to help SVM 300 monitor detection of unauthorized privilege code executing in one or more VMs of the hosts 400. XSA 405 is a virtual appliance that serves as an agent for the SVM 300 on each host in the managed cluster. XSA 405 monitors the activities in each VM 500 running on the respective host 400. XSA 405 may receive updates to the security policies from the SVM 300 and, as an agent, enforce these security policy updates on VMs 500 of host 400. XSA 405 in each host 400 assists the SVM 300 in the validation and in monitoring execution of the running-page in VM 500 of host 400. XSA 405 performs the validation of the running-page by interacting with validation database 355 to find a match of the running-page in the list of authorized pages in the white list. XSA 405 helps in the verification of the contents of the running-page against the white list maintained within validation database 355. If XSA 405 cannot find a match of the running-page in the white list, XSA 405 interacts with VM 500 and tries to find a match of the running-page in the operating system (OS) files of VM 500 on which the running-page is about to execute. The OS files are considered trusted files in the VM. If the XSA 405 cannot find a match in either the database or the OS files, XSA 405 issues a security event to WE 350 to indicate that the running-page includes code that does not have a match in the database or the OS. Based on the security event, IVE 350 issues an exception to indicate that the running-page has unauthorized code and prevents the running-page from executing on the kernel of the VM. XSA 405 may also inspect the virtual hardware, such as virtual hard drive, etc., associated with each VM of the host to ensure that software updates, including software patches, are valid. XSA 405 also helps in the application of the security policies at each of the VMs of host 400.

SVM 300 thus provides centralized deployment of security policies and uniform management of security solution for the managed cluster so that only authorized code executes on the VM. As SVM 300 is external to the VM that executes the running-page, any unauthorized code that may compromise the security of the VM or compromise the security solution in the SVM is prevented from running on the VM making this a more robust, efficient and centralized solution for managing the security of the VMs in the managed cluster.

The security solution also provides a virtual security interface (VSI) 505 at each virtual machine 500 in the managed cluster. VSI 505 interacts with XSA 405 of host 400 and is configured to detect a running-page ready for execution on the virtual machine 500, inspect certain properties of virtual hardware and execute the trace code when the running-page is about to execute based on the inspected properties. VSI 505 works with XSA 405 in providing information to IVE 350 so that unauthorized code may be prevented from running in the kernel of each virtual machine 500 of host 400.

A plug-in 150 is provided at management client 100 of the management system. Management client 100 communicates with management server 200 to provide a console for an administer to manage the managed cluster, to perform such operations as deploying or removing VMs from the managed cluster, or assigning configurations and settings. In one embodiment, Management client may be an instance of vSphere® client available from VMware, Inc. Plug-in 150 provides a user interface to enable the user, such as an administrator, to select and manage the security solution of the managed cluster. In one embodiment, the user interface is configured such that a user can select and manually apply a security policy on a VM 500 or a group of VMs, monitor the progress of SVM 300 related tasks, monitor security events including exceptions thrown by SVM 300, manually update the white list by adding, removing, and/or approving certain entries in the white list, manage the list of trusted certificate authorities and audit the related security events. SVM 300 interacts with client 100 to provide information associated with the security policies, security events including security exceptions, progress of SVM 300 relate tasks and the white list. Management server 200 may provide access to control the virtual infrastructure and deploy and configure the security solution in an ongoing basis. Server 200 also serves as a proxy for communication between the client 100 and SVM 300 on which the security solution is provided.

Figure 2:
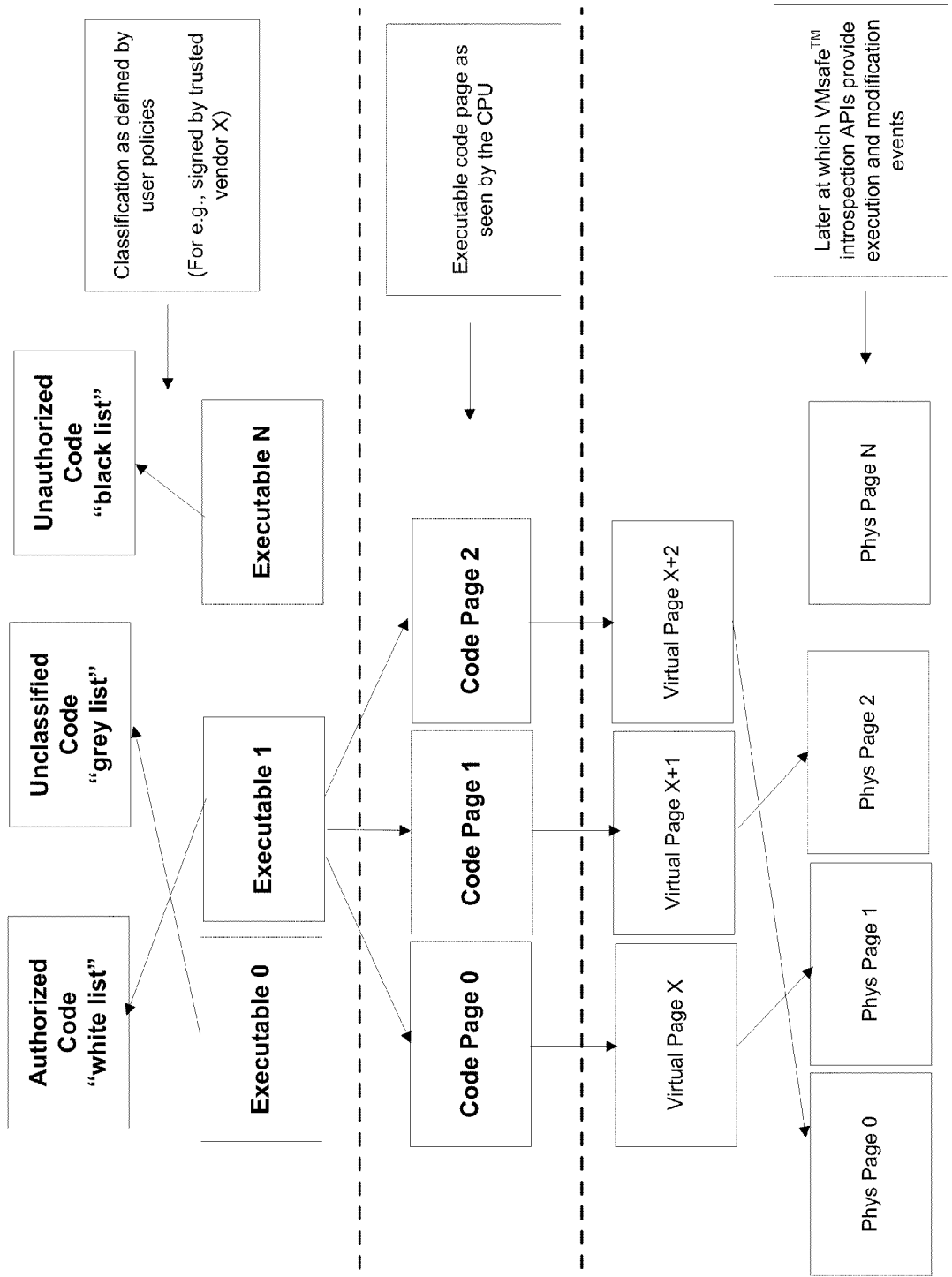
FIG. 2 illustrates a high-level approach of linking a page in virtual memory to an authorized page in a managed cluster, in accordance with one embodiment of the present invention.

With the above general description of the system, the process of matching the running-page against a list of authorized pages will now be described with reference to FIG. 2. In order to determine a match of the running-page against a list of authorized pages, one needs to understand how the page is defined and represented within the managed cluster. The first step in determining if a running-page is authorized to execute in a VM of the managed cluster, a list of authorized pages is generated. In one embodiment, SVM 300 (FIG. 1) generates and maintains a list of authorized pages based on a security policy defined for the managed cluster in which SVM 300 is a member and uses this list to authenticate the running-page. The security policies may be defined and periodically updated for the managed cluster by a user/administrator. FIG. 2 illustrates a high level approach for representing and relating physical pages of VMs within the managed cluster to the plurality of lists generated by SVM 300 that are used in detecting unauthorized codes, such as those termed "rootkit," i.e., running within the OS of a protected VM. Code running in the OS is identified as code running on the virtual processor (CPU) privileged level 0 (otherwise termed kernel mode). The current embodiments describe the process of detecting unauthorized code running in the kernel mode of the VMs. It should be noted that running code in kernel mode is exemplary and should not be considered limiting. In another embodiment, code running in user mode is also considered when detecting unauthorized code running in the VMs. Allowing unauthorized code to run in the kernel mode may seriously compromise the security of the VM and sometimes make the VM inoperable, depending on the severity of the unauthorized code.

Referring to FIG. 2, the top level of FIG. 2 depicts the plurality of lists generated and maintained by the SVM based on security policies defined for the managed cluster. As mentioned earlier, the security policies identify pages with codes that are allowed to execute and pages that are prevented from executing. As shown in FIG. 2, the white list identifies pages that are authorized to run in the VMs, the grey list identifies pages that are unclassified and black list identifies pages that are not authorized. The unclassified pages may have been obtained from sources that have not been fully verified or may include codes that are not fully validated.

Typically, a page in memory or a running-page includes both data and executable code for manipulating the data. The SVM classifies the executable codes available in the pages in memory under one of a plurality of lists, such as white list, grey list or black list, maintained by the SVM. The white list, grey list and black list are maintained by the SVM external to the VMs in the managed cluster. The above set of lists is exemplary and should not be considered limiting. Other forms of classifying may be used so long as the code pages in the VMs are properly classified. In one embodiment, the security policy may use the signature available in the page to determine if the page is an authorized page or not. The security policy may identify a list of trusted certificate authority for reference during classification of the pages in memory. Signature is an example of a page authorization metric that is used in classifying the pages in the VM. The pages that are already part of the list of files and drivers that comprise the operating system (OS) kernel of each virtual machine within the managed cluster are considered to have authorized signatures from trusted certificate authority and are automatically included in the white list as they are known to be clean and free of any malicious or unauthorized code. In addition to code pages, a set of dynamically generated code (otherwise termed code blobs) are also considered during classification of pages. Based on the signature or source of these codes, the dynamically generated codes are classified into the appropriate list by the SVM.

An executable page in memory may include code portions that are static in nature and data portions that are dynamic in nature. During execution of a page, the processor in a VM looks and executes from the code portions of the page based on the security policy. Thus, as illustrated in FIG. 2, the code portions are extracted into executable codes, Executable code 0, Executable code 1, Executable code 2, etc., and sorted into appropriate list based on the security policy. Thus, based on the security policy defined for the managed cluster, for instance, a page with code identified as "Executable 0" may be classified by the SVM under "grey" list, a page with code identified as "Executable 1" may be classified under "white" list and page with code identified as "Executable N" may be classified under "black" list. To assist the VM in determining the code portion, the executable pages are mapped to code pages. Thus, for instance, the executable page, Executable 1, is parsed to identify various code portions which are then mapped to corresponding code pages, Code Page 0, Code Page 1, Code Page 2, as shown in FIG. 2. Each individual code page is, in turn, represented at the VM as a virtual page and exposed to the SVM's application programming interface (API) as such. Thus, in the above example, Code Page 0 is represented as Virt Page X, Code Page 1 is represented as Virt Page X+1, Code Page 2 is represented as Virt Page X+2, and so on. These virtual pages are mapped to "physical" pages for each VM. Thus, Virt Page X is mapped to Phys Page 1, Virt Page X+1 is mapped to Phys Page 2, and Virt Page X+2 is mapped to Phys Page 0, and so on. It should be noted that these physical pages are pages that are perceived as "physical" to the guest OS of the VM but are not the actual physical pages. A layer of virtualization and hence another layer of indirection lies between what the guest OS of the VM considers as the physical page and the actual physical page.

During the process of identifying unauthorized code running in a VM, the SVM monitors the stream of memory page events at the VMs, identifies anonymous pages back to their original executables using the list of authorized, unclassified and unauthorized pages, and takes the appropriate action defined by user. The action may include logging the event and suspending execution of the page, generating an exception, suspend, kill the execution, taking a snapshot of the effected VM, etc. The aforementioned actions are not exhaustive but are exemplary. Other actions may be performed so long as the action prevents the unauthorized running-page from executing on the VM.

In order to ensure that a running-page is authorized to execute at the VM, the SVM generates and refers to the list of authorized pages (white list) to verify and validate the contents of the running-page. The white list may encompass thousands of files available at the VMs and the hosts within the managed cluster. The white list includes code pages and code blobs. The code pages are generated from files and drivers that comprise OS kernel of a VM and are known to be clean and malware-free. As mentioned earlier, the code pages include the code portions of the executable page in the VM. Each code page includes references to the files from which the code portions are extracted, start and end offset of all executable code in the page, the actual code, and relocation information. The code blobs, on the other hand, are portions of dynamically generated code that were manually identified after analysis. Some examples of code blobs include OS patches, interrupt handler templates, etc. The SVM maintains the white list for all the VMs in the managed cluster. The white list is maintained by the SVM external to the VMs. In one embodiment, the white list may be maintained in a validation database that is external to the VMs but available to the SVM. In addition to information of the code pages and code blobs, the white list also includes hash values of each code page and code blob. The SVM calculates the hash value of each page by parsing each page to identify all the static code portions. Using the identified static portions, the SVM calculates a hash value for each page. In one embodiment, each page is associated with one hash value that uniquely identifies the page and is stored alongside the code page in the white list of the authentication database. The hash value is calculated using any standard hash value calculator. The SVM uses the information available in the code page and validation database to determine a match of the running-page during validation of the running-page.

The process of using the hash value to identify or match a running-page with a code page in the white list will now be described with reference to FIG. 3. The matching of running-page is performed in two stages. In the first stage, a snippet code fingerprint is defined and used in finding the match in the validation database, and in the second stage, the hash value is used to complete the matching process. Based on the result of the two stage matching, the running-page is either authorized or prevented from executing on the VM. The snippet code fingerprint is a given portion of a page having a snippet of code. The given portion of the page with snippet code is described by an offset that defines a starting location and running for a length defined by an offset length. The offset and offset length is defined at the SVM and may be provided by a user. The offset length is defined to be of sufficient length to make the snippet code fingerprint considerably distinct.

To begin with, the SVM identifies the fingerprint for all pages in the white list and sorts the pages into subgroups based on the matching of the snippet code fingerprint. In one embodiment, the SVM may use a code matching algorithm, such as Aho-Corasick algorithm, to find matches to the snippet code fingerprints. Using the fingerprint, the code pages are sorted into subgroups of code pages with the code pages in each subgroup having the same unique fingerprint value. The fingerprint may be part of static portion, a dynamic portion or both static portion and dynamic portion of a code page or a running-page. The code pages with snippet code fingerprint value associated with static portion are sorted distinctly than the ones defined in the dynamic portions. The sorting of the code pages helps in finding a quick match of the running-page within the white list by matching to the subgroups. This is due to the fact that the SVM has to only look at a small subgroup of code pages to find a match of the running-page. Thus, when a running-page is received for verification, the SVM extracts a snippet of code for the running-page using the offset and offset length and matches the snippet code fingerprint value of the running-page against the subgroups of code pages in the white list to determine a match of a subgroup. The fingerprint of the running-page may be part of a dynamic portion or static portion. Depending on which type the portion the snippet code fingerprint falls under, the appropriate subgroup for the running-page is identified. Once a subgroup of codepages whose fingerprint value matches the fingerprint value of the running-page is identified, the match of the running-page with an actual code page within the subgroup is carried out using a hash value. This is done by the SVM by parsing the running-page to determine the static portions and dynamic portions, using the static portions to determine the hash value and comparing the hash value of the running-page against the hash values of the code pages in the white list. Since the number of code pages within the subgroup is sufficiently small, the verification of hash value of each code page in the subgroup is carried out faster.

Figure 3:
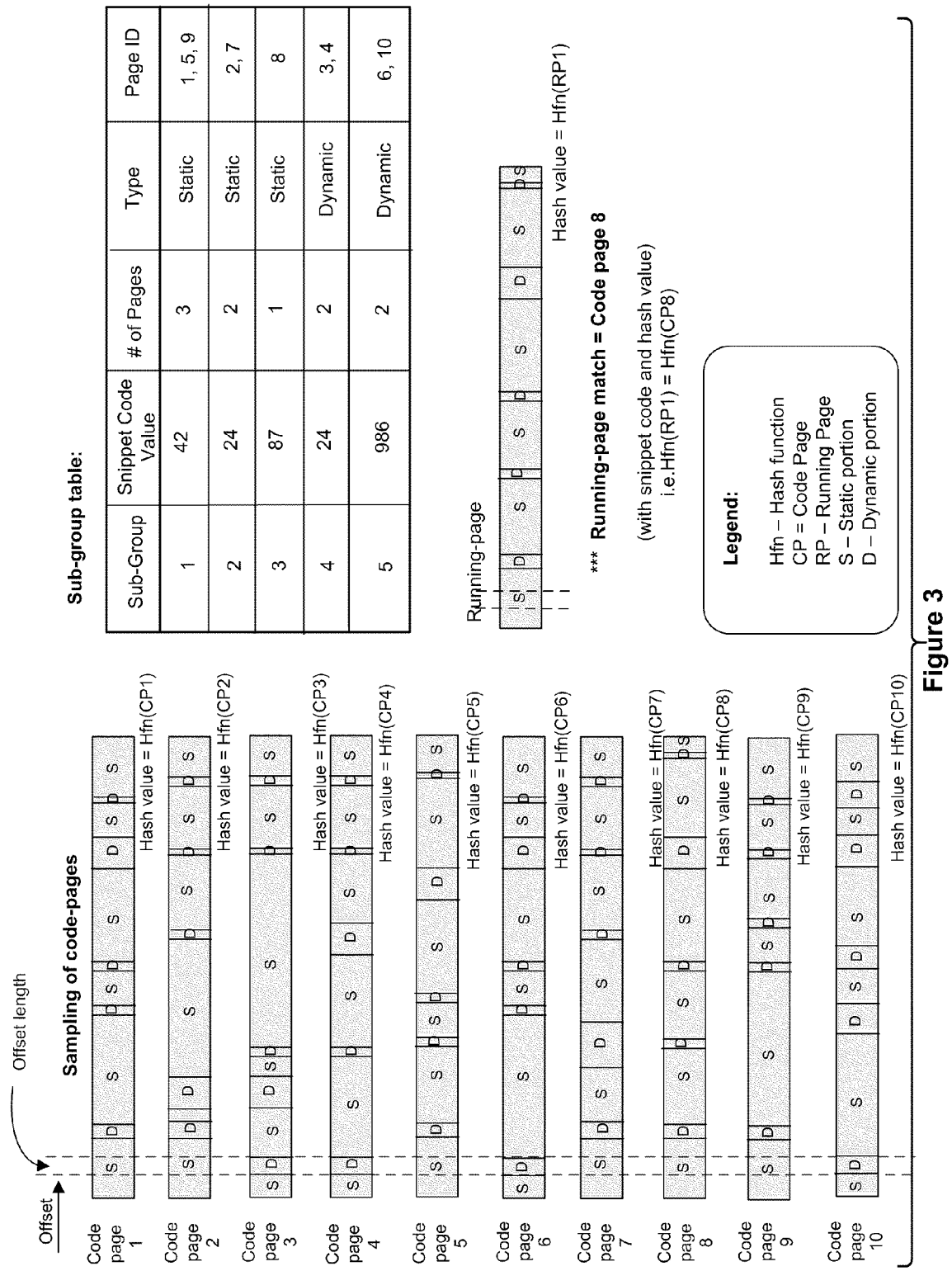
FIG. 3 illustrates a matching process used in matching a sample page within the memory of the virtual machines in the managed cluster against a running-page, in one embodiment of the invention.

This is illustrated in FIG. 3. A sampling of 10 executable code pages from the list of authorized pages (white list) is identified. A snippet code fingerprint value is determined for each code page in the white list using the offset and offset length defined at the SVM. The code pages are then sorted according to the snippet code fingerprint value into a plurality of subgroups. This is illustrated in the subgroup table in FIG. 3. The table includes the subgroup number, the snippet code value, number of pages that have the same snippet code value, the type of snippet code, and page identification for easier identification. In addition to the page identification, the virtual machine identification (not shown) may also be provided in the subgroup table. Although the subgroup table identifies only static or dynamic types, the snippet code may belong to both static and dynamic portions depending on the length of the snippet code. In such cases, the subgroup table will identify the type to be static-dynamic so as to ensure proper subgrouping of the code pages. For instance, code pages 1, 5 and 9 may have the same snippet code fingerprint value of 42 and may be sorted into subgroup1, code pages 2 and 7 may have a snippet code fingerprint value of 24 and may be sorted into subgroup2, code page 8 may have a snippet code fingerprint value of 87 and may be sorted into subgroup 3, etc., as shown. Additionally, code pages 3 and 4 may have a fingerprint value of 24 from dynamic portion. So, instead of grouping them in subgroup 2, code pages 3 and 4 are sorted into subgroup 4. This is because the fingerprint value of 3 and 4 are based on the value in the dynamic portion and the code pages in subgroup 2 include the fingerprint value in the static portion.

When the running-page is received for validation at the SVM, the SVM determines the fingerprint value of the running-page to be 87. In addition, the SVM determines that the fingerprint value of the running-page is in the static portion. Thus, the SVM matches the running-page to subgroup 3 based on the static fingerprint value. If, the fingerprint value of the running-page was from a dynamic portion instead of the static portion, then the SVM would match the running-page to a different subgroup that relates to dynamic portion instead of subgroup 3. Once the running-page has been matched to a subgroup, the SVM continues to match the running-page with a code page within the subgroup using hash value. In the example illustrated in FIG. 3, the subgroup 3 to which the running-page matched includes a single code page. This is just for illustrative purposes only. In reality, a number of pages may have the fingerprint value of subgroup 3 and be sorted into the subgroup. Even if the subgroup to which the running-page matched includes a single page, the SVM still tries to match the running-page with the code page in the subgroup using a hash value. This is to ensure that the running-page finds exact match with an authorized code page. If the hash value of the running-page, Hfn(RP1) matches the hash value of the code page Hfn(CP8), the SVM allows the running-page to execute on the VM.

In the embodiment illustrated in FIG. 3, it is seen that the snippet code of the running-page matches the snippet code of subgroup 3 both in value (snippet code value 87) and type (Static portion). Additionally, the hash value of the running-page matches the hash value of code page 8 within the subgroup 3. As mentioned earlier, even if the subgroup includes a single code page, the hash value matching has to be carried out to ensure that the running-page matches the code page exactly and matching with the hash function provides a pretty good match of the contents of the page. If, on the other hand, the hash value of the running-page does not find a match in the subgroup, then the running-page includes code that is not authorized to execute on the page. As a result, an exception will be thrown by the SVM preventing the running-page from executing on the VM. In the embodiment illustrated in FIG. 3, only one snippet code value is sought and used in grouping the code pages into subgroups. In alternate embodiments, more than one snippet code can be used to sort the code pages into subgroups.

Figure 4:
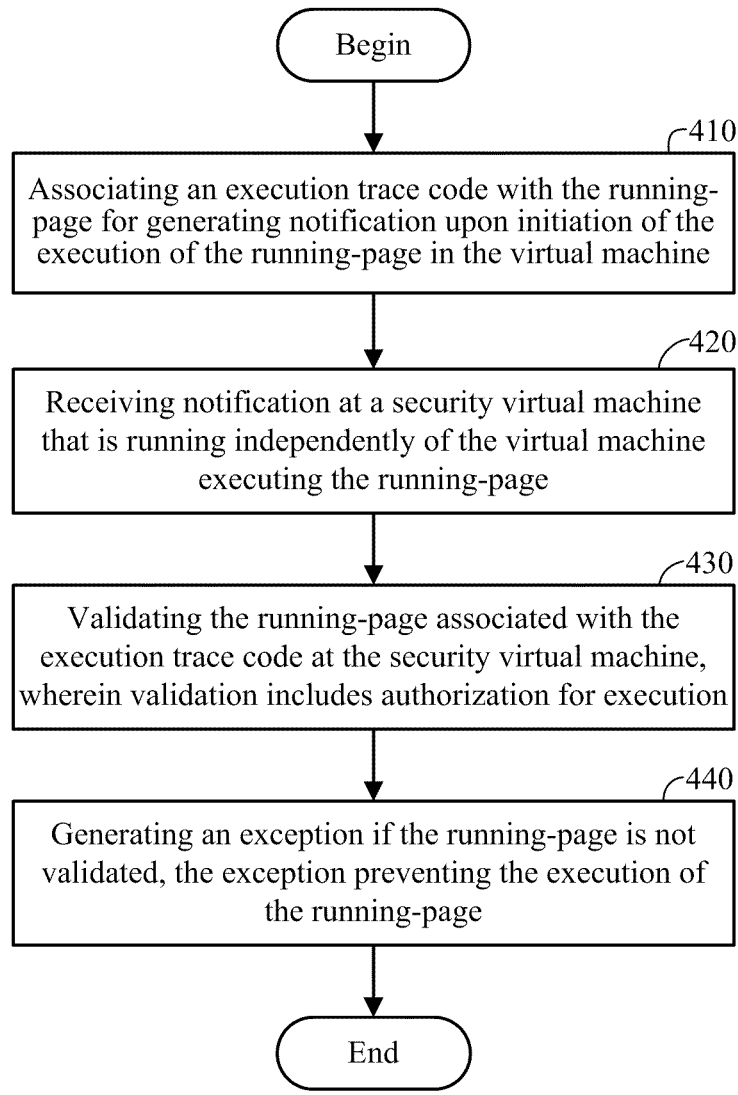
FIG. 4 illustrates a flow chart of operations used for detecting unauthorized code running in a virtual machine, in one embodiment of the invention.

FIG. 4 illustrates the process flow operation used in managing execution of a page in a virtual machine. The process begins at operation 410 when a SVM within a managed cluster parses all the pages in all the VMs in the managed cluster and associates an execution trace code in each of the pages. The managed cluster includes a plurality of hosts with each host potentially running a plurality of VMs. A separate and distinct SVM is identified within the managed cluster to manage the execution of running pages in the VMs within the managed cluster. The SVM receives a notification of a running-page that is ready to execute at a VM, as illustrated in operation 420. The notification is received at the SVM based on the triggering of the execution trace code and includes the identity of the running-page and the associated VM. The execution trace code may include logic that tracks activity at the running-page and triggers the event when the processor state or the memory access state associated with the VM changes indicating that the running-page is set for execution.

The SVM validates the code in the running-page to ensure that the running-page does not include any malicious code that may compromise the associated VM, as illustrated in operation 430. The SVM validates the code in the running-page by first pausing the execution of the running-page in the identified VM based on the notification so that the page does not execute without validation. Next, the SVM performs a code match using the two-stage approach described earlier with reference to FIG. 3. In the first stage, the SVM matches the running-page to a subgroup of authorized code pages, and in the second stage, the SVM generates a hash value for the running-page and matches the hash value of the running-page against hash values of code-pages within the identified subgroup. During the matching to the subgroup, the SVM determines a snippet code fingerprint value of the running-page and identifies the type of the snippet code by determining if the snippet code is part of a static portion, a dynamic portion or a combination of static portion and dynamic portion. Depending on the type of the snippet code of the running-page, the SVM matches to the appropriate subgroup of code pages in the validation database. Then the SVM tries to match the running-page with one of the code pages in the identified subgroup by calculating the hash value of the running-page and matching the hash value of the running-page against the hash-value of the code pages in the subgroup.

If the SVM does not find a match in the identified subgroup, then it means that the running-page includes code that is not authorized. At this time, the SVM generates an exception for the running-page, as illustrated in operation 440. The exception thrown by the SVM may be suspension event, a kill event, a jump event, or any other event that prevents the running-page from executing on the VM. The process ends with the suspension of the unauthorized running-page preventing execution.

Figure 5:
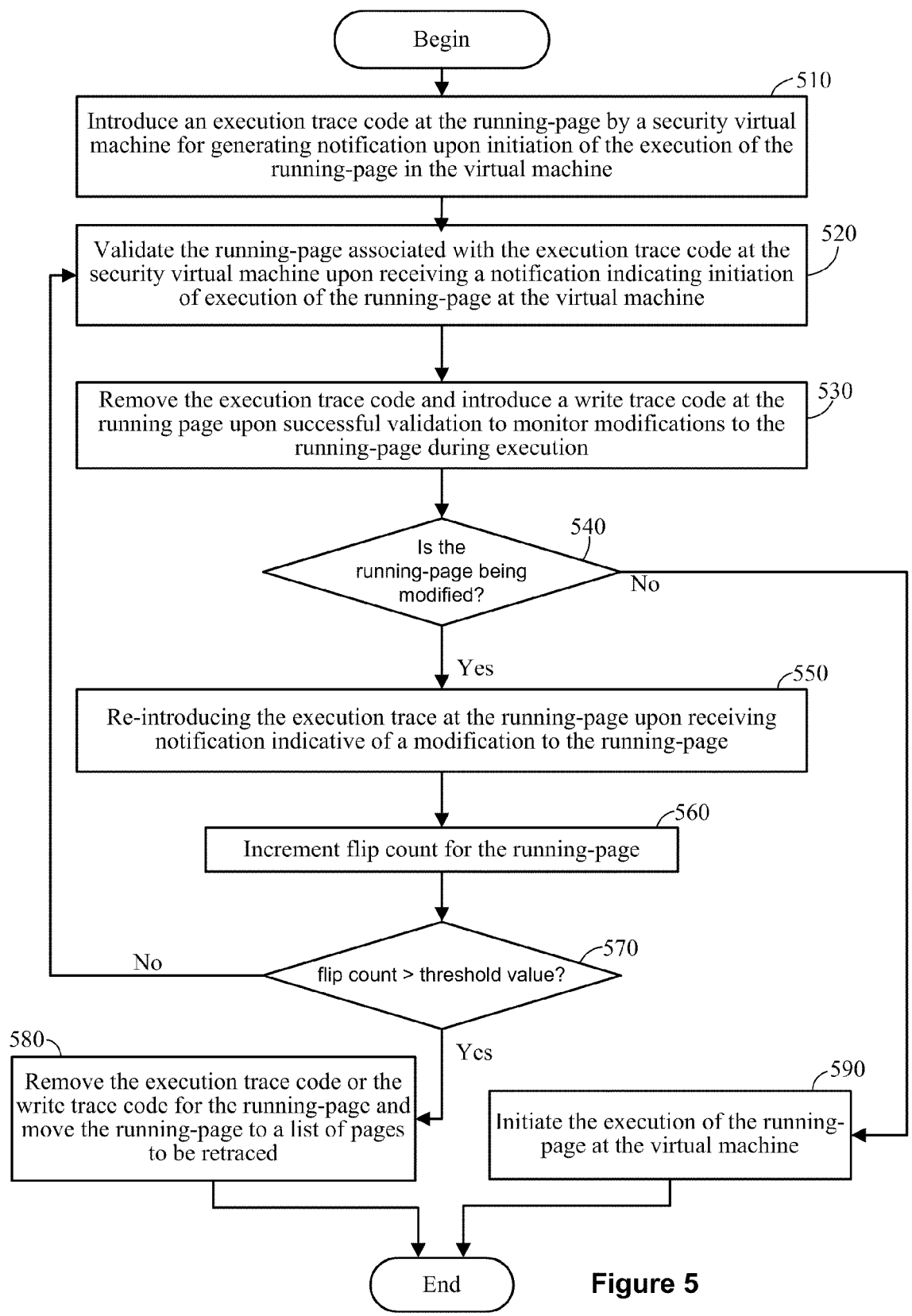
FIG. 5 illustrates a flow chart of operations used for managing execution of a running-page in a virtual machine, in an alternate embodiment of the invention.

FIG. 5 illustrates defining the process flow operation used in managing execution of a page in a virtual machine, in another embodiment. The process begins at operation 510 when a SVM within a managed cluster parses all the pages in all the VMs in the managed cluster and associates an execution trace code in each of the pages. The pages in all the VMs are considered authorized pages and include operating system files and files from trusted certificate authorities. The managed cluster includes a plurality of hosts with each host running a plurality of VMs. SVM within the managed cluster is used to manage the execution of the pages in the VMs within the managed cluster. The SVM validates a running-page associated with the execution trace code upon receiving a notification that the running-page is initiated for execution at a VM, as illustrated in operation 520. The notification is received at the SVM based on the triggering of the execution trace code and includes the identity of the running-page and the associated VM. The execution trace code may include logic that tracks activity of the running-page and triggers the event when the processor state or the memory access state associated with the VM changes indicating that the running-page is set for execution.

The SVM validates the code in the running-page to ensure that the running-page does not include any malicious code that may compromise the associated VM. Before validation of the running-page, the SVM pauses the running-page in the identified VM based on the notification so that the page does not execute without validation. The SVM performs the validation of the running-page using the two-stage approach discussed extensively with reference to FIG. 3 by identifying a subgroup that matches a snippet code fingerprint of the running-page and then using the hash value of the running-page to determine a match of a code page within the identified subgroup. If the SVM finds a match of the running-page in one of the code pages in the identified subgroup, the SVM removes the execution trace code on the running-page, introduces a write trace code and allows the execution of the running-page, as the code in the running-page match the authorized code in the validation database, as illustrated in operation 530. The write trace is to monitor any modification to the running-page during execution.

Then, at decision point 540, it is determined if the running-page was modified during execution. Modification to the running-page is determined by the triggering of the write trace code. If the write trace code is triggered indicating the running-page was modified, the SVM removes the write trace code and re-introduces the execution trace code, as illustrated in operation 550, so that the running-page can be validated during subsequent execution. This is to ensure that the modifications made to the running-page are validated to ensure no malware was introduced when modified during the previous execution. At the same time, the SVM increments a flip count for the running-page, as illustrated in operation 560. The flip count tracks the number of times a given running-page flips between execution trace code and write trace code to determine if the running-page needs to be closely monitored or not. The running-page may include a lot of modifications if the running-page is data intensive or if the running-page incurs a lot of events, or if the running-page was a non-privileged page, etc. In such a case, it is not efficient to tie the SVM for verifying and re-verifying the running-page. By tracking the flip count, the SVM tries to determine if the running-page needs to be closely monitored by validating the running-page real-time or if it is sufficient to validate the running-page periodically. For instance, the period monitoring may be appropriate for a non-privileged running-page. Thus, after incrementing the flip count for the running-page, the SVM determines if the flip count has exceeded a threshold value, as illustrated in decision point 570. If the flip count is greater than the threshold value, the SVM removes the execution trace code or the write trace code from the running-page and moves the running-page into a list of pages to be retraced and verified subsequently, as illustrated in operation 580. If, on the other hand, the SVM determines that the flip count for the running-page has not exceeded the threshold value, the running-page is validated when the running-page is initiated for subsequent execution.

If, at decision point 540, the SVM determines that the running-page is not being modified, the process flows to operation 590 where the execution of the running-page is initiated at the virtual machine. The execution of the running-page is initiated since the running-page has already been successfully validated and no modification to the running-page has occurred since the last successful validation. As a result, no additional validation is needed and the running page has authorized code. The process ends upon initiating execution of the running-page at the VM or when the running-page is moved to a list of pages for periodic verification.

The pages that are set for periodic verification are included in a "retrace" list. The SVM, during periodic verification of the pages in the retrace list, will introduce the execution trace on these pages, perform the validation of the pages and remove the execution trace after verification.

In another embodiment, a system for managing execution of a running-page in a virtual machine running on a host within a managed cluster is disclosed. The system includes a virtual security interface in the virtual machine, an external security agent (XSA) deployed at the host of the virtual machine and a security server virtual machine (SVM) within the managed cluster that is different from the other virtual machines in the managed cluster. The virtual security interface (VSI) is configured to detect initiation of an execution of a running-page through an execution trace code associated with the running-page. The execution trace code generates a notification the running-page is initiated for execution. The VSI is also configured to inspect state of processor and memory and update software available on a virtual hard drive associated with the virtual machine.

The XSA in the host acts as an interface between the host and the SVM. The XSA is configured to enforce security policies defined for the managed cluster at the virtual machine, monitor execution and modification of the running-page on the virtual machine, assist in verification of the running-page prior to execution on the virtual machine, inspect the virtual hard drive associated with the virtual machine to ensure software updates are valid and trigger a security event when the verification of the running-page is unsuccessful.

The SVM includes an intercept verification engine (IVE) that is configured to introduce the execution trace code to notify when the running-page is initiated for execution at the virtual machine, manage the verification and execution of the running-page by pausing execution of the running-page in the virtual machine based on the notification received from the execution trace code, validating contents of the running-page, reporting security events triggered at the running-page due to unsuccessful validation, removing the execution trace code and introducing a write trace code upon successful validation of the contents of the running-page, and managing security policy for the managed cluster including updates to security policy. The removal of the execution trace allows execution of the running-page at the virtual machine. The updates to security policy include one or both of content update and code updates. The SVM is also configured to deploy the XSA to the host, update a list of authorized pages used in validating contents of the running-page based on the security policy, transmit updated security policy to the XSA, and manage the list of authorized pages by adding, removing, approving one or more authorized pages.

Thus, the current embodiments describe methods to manage the execution of the running-page in any VM of the managed cluster external to the VM using an authorized list that is maintained external to the VMs. The SVM provides a secure, flexible, distributed and centralized security solution for managing the execution of the running-page that is OS agnostic, external to the VMs that are executing the running-page, isolated so as to ensure the security solution itself is not compromised, and that automatically supports OS updates and patches, service packs.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for managing execution of a running-page in a virtual machine running on a first host, comprising:
   associating a first trace code with the running-page, wherein the first trace code generates a notification upon initiation of the execution of the running-page by the virtual machine;
   receiving, at a security virtual machine executing on a second host that is distinct from the first host, the notification;
   determining that the running-page includes code that is configured to execute at a kernel level of the virtual machine;
   based on the determination, intercepting, by the security virtual machine, the execution of the running-page at the virtual machine;
   comparing the running-page with a list that identifies pages that are authorized to execute at the kernel level of the virtual machine;
   based on the comparing, determining if code within the running-page is authorized for executing at the kernel level of the virtual machine; and
   if the code is authorized:
      validating, by the security virtual machine, the running-page associated with the first trace code as authorized for execution;
      replacing the first trace code with a second trace code; and
      permitting execution of the running-page in the virtual machine; and
   if the code is unauthorized, generating, by the security virtual machine, an exception that prevents the execution of the running-page in the virtual machine.

2. The computer implemented method of claim 1, wherein upon generation of the notification, the execution of the running-page is paused.

3. The computer implemented method of claim 1, further comprising generating the list of identified pages, wherein the generated list of identified pages further includes a list of unauthorized pages and/or unclassified pages.

4. The computer implemented method of claim 1, wherein the list of identified pages includes code blobs that are dynamically generated code manually identified after analysis.

5. The computer implemented method of claim 1, wherein if the code is unauthorized:

amending certain key register values such that the running-page can match with one of the identified pages; and updating the identified list for files associated with the modified key register values.

6. The computer implemented method of claim 1, further comprising:

upon validating the running-page or generating an exception, adding the running-page to a retrace list; and after a predefined period of time, for each page in the retrace list, comparing each page in the retrace list with the list that identifies pages that are authorized to execute at the kernel level of the virtual machine.

7. The computer implemented method of claim 1, further comprising receiving a notification of modification, if the running-page is modified during execution of the running-page in the virtual machine, wherein the notification of modification of the running-page to the security virtual machine is through a trigger of the second trace code.

8. The computer implemented method of claim 7, wherein upon modification of the running-page, replacing the second trace code for the modified running-page with the first trace code so as to initiate validation of the modified running-page if the modified running-page is subsequently executed by the virtual machine, wherein the replacing of the second trace code for the modified running-page is performed by the security virtual machine.

9. The computer implemented method of claim 8, further comprising:

establishing a threshold value for flipping between the first trace code and the second trace code for the running-page;

monitoring the flipping between the first trace code and the second trace code for the running-page, wherein the security virtual machine monitors the flipping; and removing the association of the first trace code or the second trace code associated with the running-page upon reaching the threshold value for flipping, so as to permit subsequent execution of the running-page without notification to the security virtual machine.

10. The computer implemented method of claim 9 further comprising re-associating the first trace code with the running-page, so as to reinitiate notification of the execution of the running-page by the virtual machine to the security virtual machine.

11. The computer implemented method of claim 1, wherein comparing the running-page with a list that identifies pages that are authorized to execute at the kernel level of the virtual machine further comprises:

identifying a snippet of code fingerprint for each of the identified pages in the list, the snippet of code fingerprint being a given portion of each page having a snippet code described by an offset that defines a starting location and running for a length defined by an offset length;

assigning each of the identified pages in the list to one of a plurality of subgroups, wherein each of the identified pages in a subgroup has a common snippet of code in a given portion of a respective authorized page;

extracting a snippet of code for the running-page;

identifying the subgroup for the running-page based on the extracted snippet of code; and comparing the running-page with each of the pages in the identified subgroup for a match, wherein the running-page and each of the identified pages include one or more static portions and one or more dynamic portions.

12. The computer implemented method of claim 11, wherein assigning each of the plurality of authorized pages further includes, classifying the snippet of code by a type based upon whether the snippet of code includes only the one or more static portions, the one or more dynamic portions or a combination of the one or more static portions and the one or more dynamic portions; and assigning authorized pages with a same snippet of code to a different subgroup based upon a type of snippet of code.

13. The computer implemented method of claim 11, wherein comparing the running-page with each of the identified pages in the identified subgroup further includes:

identifying static portions of the running-page and each of the identified pages in the identified subgroup;

computing, using the identified static portions, a hash value for the running-page and each of the identified pages in the identified subgroup; and comparing the computed hash value for the running-page with the computed hash value for each of the identified pages in the identified subgroup for a match.

14. A computer program embedded in a computer-readable storage medium for managing execution of a running-page in a virtual machine running on a first host, the computer program, when executed by one or more processors, causes the one or more processors to perform the steps of:

associating a first trace code with the running-page, wherein the first trace code generates a notification upon initiation of the execution of the running-page by the virtual machine;

receiving, by a security virtual machine executing on a second host that is distinct from the first host, the notification;

determining that the running-page includes code that is configured to execute at a kernel level of the virtual machine;

based on the determination, intercepting, by the security virtual machine, the execution of the running-page at the virtual machine;

comparing the running-page with a list that identifies pages that are authorized to execute at the kernel level of the virtual machine;

based on the comparing, determining if code within the running-page is authorized for executing at the kernel level of the virtual machine; and if the code is authorized:

validating, by the security virtual machine, the running-page associated with the first trace code as authorized for execution;

replacing the first trace code with a second trace code for the running-page; and permitting execution of the running-page in the virtual machine; and if the code is unauthorized, generating, by the security virtual machine, an exception that prevents the execution of the running-page in the virtual machine.

15. The computer program of claim 14, wherein upon generation of the notification, the one or more processors further preform the step of pausing execution of the running-page.

16. The computer program of claim 14, wherein the one or more processors further perform the step of receiving a notification of modification, if the running-page is modified during execution of the running-page in the virtual machine, wherein the notification of the modification of the running-page to the security virtual machine is obtained through the triggering of the second trace code.

17. The computer program of claim 16, wherein the one or more processors further perform the step of replacing the second trace code, upon modification of the running-page, with the first trace code for the modified running-page by the security virtual machine, so as to initiate validation of the modified running-page during subsequent execution of the modified running-page by the virtual machine.

18. The computer program of claim 17, wherein the one or more processors further perform the steps of:
establishing a threshold value for flipping between the first trace code and the second trace code for the running-page;
monitoring the flipping between the first trace code and the second trace code for the running-page, wherein the flipping is monitored by the security virtual machine; and
removing the association of the first trace code or the second trace code associated with the running-page upon reaching the threshold value for flipping, so as to permit subsequent execution of the running-page without notification to the security virtual machine.

19. The computer program of claim 18, wherein the one or more processors further perform the step of re-associating the first trace code with the running-page, so as to reinitiate notification of the execution of the running-page by the virtual machine to the security virtual machine.

20. The computer program of claim 14, wherein validating the running-page further includes comparing contents of the running-page with contents of a plurality of authorized pages for execution, wherein the comparison is performed by the security virtual machine.

21. The computer program of claim 20, wherein comparing the contents of the running-page further includes:
assigning each of the plurality of authorized pages to one of the plurality of subgroups, wherein each of the plurality of authorized pages in a subgroup has a common snippet of code in a given portion of a respective authorized page, wherein the given portion of the respective authorized page is defined by an offset value to define a beginning of the snippet of code in the respective authorized page and a length value to define a length of the snippet of code;
extracting the snippet of code using the offset value and length value for the running-page;
identifying the subgroup for the running-page based on the extracted snippet of code; and
comparing the running-page with each of the plurality of authorized pages in the identified subgroup to detect a match,
wherein the running-page and each of the plurality of authorized pages include one or more static portions and one or more dynamic portions.

22. The computer program of claim 21, wherein assigning each of the plurality of authorized pages further includes:
classifying the snippet of code by a type based upon whether the snippet of code is part of only the one or more static portions, only the one or more dynamic portions or a combination of the one or more static portions and the one or more dynamic portions; and
assigning pages with a same snippet of code to a different subgroup based upon a type of snippet of code.

23. The computer program of claim 22, wherein comparing the running-page with each of the plurality of authorized pages in the identified subgroup further includes:
computing a hash value for each of the plurality of authorized pages in the identified subgroup using the one or more static portions of each of the plurality of authorized pages;
computing a hash value for the running-page using the one or more static portions of the running-page; and
comparing the computed hash value for the running-page with the computed hash value for each of the plurality of authorized pages in the identified subgroup for a match.

24. A system for managing execution of a running-page in a virtual machine on a host within a managed cluster of virtual machines, the system comprising:
a virtual security interface in the virtual machine, the virtual security interface configured to:
detect initiation of an execution of a running-page at a kernel level of the virtual machine,
monitor security events at the virtual machine,
inspect state of virtual hardware associated with the virtual machine,
apply updates to software available at a virtual hard drive associated with the virtual machine, and
receive and update security policies at the virtual machine;
an external security agent deployed at the host for the virtual machine to manage execution of the running-page at the virtual machine, the external security agent configured to:
enforce security policies,
monitor execution and modification of the running-page,
assist in a verification of the running-page, and
trigger a security event if the verification of the running-page is unsuccessful; and
a security server virtual machine within the managed cluster that is distinct and separate from the virtual machine, the security server virtual machine having an intercept verification engine, the intercept verification engine configured to:
introduce one of a first trace code or a second trace code in the running-page;
based on determining that the running-page includes code that is configured to execute at a kernel level of the virtual machine, intercept the execution of the running-page at the virtual machine;
compare the running-page with a list that identifies pages that are authorized to execute at the kernel level of the virtual machine;
based on the comparing, determine if code within the running-page is authorized for executing at the kernel level of the virtual machine; and
if the code is authorized;
validating the running-page associated with the first trace code as authorized for execution;
replacing the first trace code with a second trace code, and
permitting execution of the running-page in the virtual machine, and
if the code is unauthorized, generating an exception that prevents the execution of the running-page in the virtual machine.

25. The system of claim 24, wherein the security server virtual machine is further configured to transmit the security policy including updates to the external security agent for applying at the virtual machine, and manage a list of authorized pages based on the security policy, wherein the managing list of authorized pages includes adding, removing, and approving one or more authorized pages.

26. The system of claim 24, further includes a validation database to store and manage a list of authorized pages, wherein the security server virtual machine is configured to interact with the validation database during validation of a contents of the running-page.

27. A computer implemented method for managing execution of a running-page in a virtual machine, comprising:
   introducing, by a security virtual machine that is independent of the virtual machine executing the running-page, a first trace code at the running-page, wherein the first trace code generates a notification to the security virtual machine upon initiation of the execution of the running-page by the virtual machine;
   determining that the running-page includes code that is configured to execute at a kernel level of the virtual machine;
   based on the determination, intercepting, by the security virtual machine, the execution of the running-page at the virtual machine;
   comparing the running-page with a list that identifies pages that are authorized to execute at the kernel level of the virtual machine;
   based on the comparing, determining if code within the running-page is authorized for executing at the kernel level of the virtual machine;
   validating the running-page associated with the first trace code as authorized for execution upon receiving a notification indicative of the initiation of the execution of the running-page, wherein the validation is performed by the security virtual machine;
   replacing the first trace code with a second trace code to monitor modification to the running-page, if the running-page is authorized for execution, and permitting execution of the running-page in the virtual machine;
   determining any modification to the running-page at the security virtual machine during execution in the virtual machine, the modification determined through receipt of a notification from the second trace code;
   replacing the second trace code for the modified running-page with the first trace code so as to initiate validation of the modified running-page when the modified running-page is subsequently executed by the virtual machine, wherein the replacing of the second trace code for the modified running-page is performed by the security virtual machine;
   incrementing a flip count for the running-page by the security virtual machine when the second trace code is replaced by the first trace code;
   monitoring the flipping between the first trace code and the second code for the running-page, wherein the security virtual machine monitors the flipping; and
   permitting the execution of the running-page by the security virtual machine based on the monitoring of the flipping.

28. The method of claim 27, wherein permitting execution of the running-page further includes, establishing a threshold value for flipping between the first trace code and the second trace code for the running-page by the security virtual machine; and
   removing the association of the first trace code or the second trace code associated with the running-page when the flip count exceeds the threshold value, so as to permit subsequent execution of the running-page without notification to the security virtual machine.

29. A computer implemented method for managing execution of a running-page in a virtual machine, comprising:
   associating a first trace code with the running-page, wherein the first trace code generates a notification upon initiation of the execution of the running-page by the virtual machine;
   receiving the notification, wherein the notification is received by a security virtual machine running independent of the virtual machine executing the running-page;
   determining that the running-page includes code that is configured to execute at a kernel level of the virtual machine;
   based on the determination, intercepting, by the security virtual machine, the execution of the running-page at the virtual machine;
   comparing the running-page with a list that identifies pages that are authorized to execute at the kernel level of the virtual machine;
   based on the comparing, determining if code within the running-page is authorized for executing at the kernel level of the virtual machine; and
   based on the determination that the code is authorized:
      validating, by the security virtual machine, the running-page associated with the first trace code as authorized for execution;
      replacing the first trace code with a second trace code; and
      permitting execution of the running-page in the virtual machine.

30. The method of claim 29, wherein upon generation of the notification, the execution of the running-page is paused.

31. The method of claim 29, further comprising:
   comparing contents of the running-page with contents of a plurality of authorized pages for execution, the comparing of the contents is performed by identifying a subgroup of the plurality of authorized pages, wherein each page of the plurality of authorized pages includes one or more static portions and one or more dynamic portions; and
   finding a match of the running-page within the identified subgroup of the authorized;
   wherein identifying a subgroup for the running-page further includes:
      identifying a snippet of code in a given portion of a page for each of the plurality of authorized pages;
      classifying the snippet of code by a type based upon whether the snippet of code belongs to only the one or more static portions, only the one or more dynamic portions or a combination of the one or more static portions and the one or more dynamic portions; and
      assigning each of the plurality of authorized pages to one of a plurality of subgroups based upon the snippet of code such that each authorized page in a subgroup has a common snippet of code of a given type in the given portion of the authorized page;
      extracting a snippet of code for the running-page; and
      identifying the subgroup for the running-page based on the extracted snippet of code,
      wherein the identifying of a subgroup is performed by the security virtual machine.

32. The method of claim 3, wherein the given portion of the running-page and the authorized pages is defined by an offset value to define a beginning of the snippet of code in the corresponding page and a length value to define a length of the snippet of code.

33. The method of claim 31, wherein finding a match of the running-page using hash value further includes,
   computing a hash value for each of the plurality of authorized pages in the identified subgroup;

computing a hash value for the running-page; and
comparing the computed hash value for the running-page with the computed hash value for each of the plurality of authorized pages in the identified subgroup for a match.

\* \* \* \* \*